United States Patent [19]

Albin et al.

[11] Patent Number: 5,719,556
[45] Date of Patent: Feb. 17, 1998

[54] LIQUID LEVEL SENSOR UTILIZING AC AND RESISTANCE

[76] Inventors: Robert Albin, 7921 Rustling Bark Ct., Ellicott City, Md. 21043; John A. Cacciola, 505 Pine Tree Dr., Severna Park, Md. 21146

[21] Appl. No.: 802,357

[22] Filed: Feb. 11, 1997

Related U.S. Application Data

[63] Continuation-in-part of Ser. No. 447,293, May 22, 1995, Pat. No. 5,623,252.

[51] Int. Cl.$^6$ .................................................. G08B 21/00
[52] U.S. Cl. .................. 340/618; 340/620; 73/290 R; 73/304 R
[58] Field of Search ............................... 340/618, 620; 324/690; 73/290 R, 304 R

[56] References Cited

U.S. PATENT DOCUMENTS

| | | | |
|---|---|---|---|
| Re. 34,601 | 5/1994 | Hochstein | 73/304 |
| 3,252,420 | 5/1966 | Sorensen | 103/25 |
| 3,581,197 | 5/1971 | Morey, Jr. | 324/61 |
| 4,002,996 | 1/1977 | Klebanoff et al. | 331/65 |
| 4,007,636 | 2/1977 | Wahl | 73/290 R |
| 4,056,978 | 11/1977 | Zimmermann | 340/620 |
| 4,110,740 | 8/1978 | Akita et al. | 340/620 |
| 4,125,021 | 11/1978 | Kamei et al. | 73/304 R |
| 4,182,363 | 1/1980 | Fuller | 137/392 |
| 4,367,462 | 1/1983 | Dressler | 340/620 |
| 4,382,382 | 5/1983 | Wang | 73/304 |
| 4,392,128 | 7/1983 | Young et al. | 340/616 |
| 4,433,420 | 2/1984 | Dunn | 373/39 |
| 4,480,251 | 10/1984 | McNaughton et al. | 340/604 |
| 4,555,941 | 12/1985 | Fathauer et al. | 73/304 C |
| 4,591,839 | 5/1986 | Charboneau et al. | 340/620 |
| 4,676,101 | 6/1987 | Baughman | 73/304 |
| 4,763,077 | 8/1988 | Miller | 324/439 |
| 4,782,698 | 11/1988 | Wilson | 73/304 |
| 4,800,755 | 1/1989 | Fathauer et al. | 73/304 C |
| 4,806,847 | 2/1989 | Atherton et al. | 324/61 P |
| 4,879,902 | 11/1989 | Loniello | 73/304 |
| 4,903,530 | 2/1990 | Hull | 73/304 |
| 4,947,689 | 8/1990 | Hochstein | 73/304 |
| 4,987,776 | 1/1991 | Koon | 73/304 |
| 5,103,368 | 4/1992 | Hart | 361/284 |
| 5,103,672 | 4/1992 | Terry, Jr. et al. | 73/304 C |
| 5,138,880 | 8/1992 | Lee et al. | 73/304 |
| 5,142,909 | 9/1992 | Baughman | 73/304 |
| 5,148,125 | 9/1992 | Woodhead et al. | 331/135 |
| 5,226,313 | 7/1993 | Murata et al. | 73/149 |
| 5,287,086 | 2/1994 | Gibb | 340/618 |
| 5,446,444 | 8/1995 | Lease | 340/514 |

*Primary Examiner*—Jeffery Hofsass
*Assistant Examiner*—John Tweel, Jr.
*Attorney, Agent, or Firm*—Michael F. Petock, Esq.

[57] ABSTRACT

A liquid level detecting system for detecting a conducting liquid level in a non conductive container which utilizes a grounding rod mounted in a lower portion of the container and a conductive sensing rod mounted at a position above the grounding rod. An oscillator is provided having a frequency in the range of about 600 hertz to about 100 kilohertz. The output of the oscillator is applied to the sensing rod through a high impedance circuit and a high pass filter. In another embodiment, the high pass filter may have the higher end frequencies attenuated to produce a band pass filter which selectively passes the frequency of the oscillator. The voltage drop across the circuit which includes the conductive sensing rod to ground is detected by a voltage peak detector and a threshold detector to produce an output which detects the drops in voltage when the conductive fluid level in the tank rises so that both the sensing rod and the grounding rod are covered, completing the circuit. In another embodiment, multiple sensing rods may be positioned at various heights in the tank to detect various fluid levels. The use of the high pass or band pass filters in series with the sensing rod and ground will eliminate any DC current in the rods thereby reducing electrolysis. The filters also eliminate or significantly reduce interference or artifacts due to DC and 60 hertz.

15 Claims, 2 Drawing Sheets

LIQUID LEVEL SENSOR UTILIZING AC AND RESISTANCE

CROSS-REFERENCE TO RELATED APPLICATION

This application is a continuation-in-part application of application Ser. No. 08/447,293 filed May 22, 1995 by one of the inventors herein, John A. Cacciola, and Randal J. Cacciola, and entitled LIQUID LEVEL DETECTOR USING AUDIO FREQUENCIES. The filing date of the prior application is claimed for so much as is common in this application. The teachings of the parent application are incorporated herein by reference the same as if set forth at length.

FIELD OF THE INVENTION

The present invention relates to a liquid level detector. More particularly, the present invention relates to a liquid level detector which utilizes AC in the audio frequency range (meaning herein approximately 600 hertz to approximately 100 kilohertz) and a high impedance to produce reliable outputs with reduced electrolysis of rod detector elements which come into contact with the fluid.

BACKGROUND OF THE INVENTION

Much work has been done in the field of liquid level detectors. The prior art work has ranged from floatation sensors to capacitance detectors wherein the capacitance changes as a result of a fluid level change between the plates of the capacitor. For example, see U.S. Pat. No. 5,287,086—Gibb, wherein the rise in level of the conductive liquid causes an oscillator to switch its mode of oscillation. A number of prior art attempts have utilized RF frequencies in liquid level detection systems, for example see U.S. Pat. No. 4,800,755—Fathauer, et al., which utilizes a phase detector for detecting variations in phase angle as a function of probe capacitance.

Several attempts have been made in the past in utilizing liquid level sensing systems which utilize probes depending into the liquid. For example, see U.S. Pat. Nos. 4,182,363—Fuller and 4,903,530—Hull. Young et al. disclose in U.S. Pat. No. 4,392,128 a sewage back-up alarm which utilizes a pair of depending metal strips. All three of these are operated on 60 cycle AC, which is utilized in power line applications.

Further, none of the prior art devices provide the advantages of the invention disclosed herein, including the use of an audio frequency in the range of 600 hertz to 100 kilohertz in conjunction with a high impedance circuit which greatly reduces electrolysis while providing a reliable and economical circuit for use in measuring fluid levels in conductive liquids, and particularly conductive liquids which may contain sludge.

SUMMARY OF THE INVENTION

The present invention provides significant advantages over the prior art.

One of the advantages of the present invention is that it enables the use of an AC current in an audio frequency range from about 600 hertz to about 100 kilohertz, thereby greatly reducing electrolysis and electrolytic effects on the sensing rods in the tank as compared with DC circuits.

Another advantage of the present invention is that the use of high impedance circuits also helps to greatly reduce electrolysis and electrolytic effects and extend sensing rod life.

Another advantage of the present invention is that it incorporates high pass filters for use in connection with the aforesaid audio frequencies and high impedance circuits to allow the system to reduce 60 hertz interference and block any DC voltage level in the tank in which the fluid level measurements take place.

Another advantage of the present invention is that band pass filters may be used in place of the high pass filters to reduce or eliminate interference from RF frequencies as well as from the power line 60 hertz frequency.

Another advantage of the present invention is that it is easily expanded for multi-level sensing.

Another advantage of the present invention is that the audio frequencies in the range of about 600 hertz to about 100 kilohertz minimize electromagnetic interference from RF frequencies and 60 hertz interference at the low end, and the invention further eliminates any effects which would be caused by DC voltage levels in the tank in which the fluid level is being measured.

Another advantage of the present invention is that components are reasonably inexpensive and readily available in the aforesaid frequency range and are easily assembled into practical circuits.

Another advantage of the present invention is that by insulating the sensing rods, except for the tip, the chance of false readings due to shorts from the top of the rod, such as might be cause by a conductive path through sludge, is eliminated or reduced.

Briefly and basically, in accordance with the present invention, a liquid level detection system for detecting a conductive liquid level is provided wherein a conductive AC grounding rod is mounted in a lower portion of the container with a first electrical filter connected between it and ground. This first electrical filter blocks DC current and passes AC current above approximately 600 hertz. A conductive sensing rod is mounted in the container at a position above the AC grounding rod. An oscillator is provided for producing an output frequency in the range of about 600 hertz to about 100 kilohertz. The output of the oscillator is supplied to the conductive sensing rod through a high impedance circuit and a second electrical filter which blocks DC current and passes AC current above 600 hertz. A voltage peak detector is provided for detecting peak voltage output from said second electrical filter to ground. A threshold detector receives the output of the voltage peak detector and produces a change in the output signal when the conductive liquid level in the container immerses both the conductive grounding rod and the conductive sensing rod.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
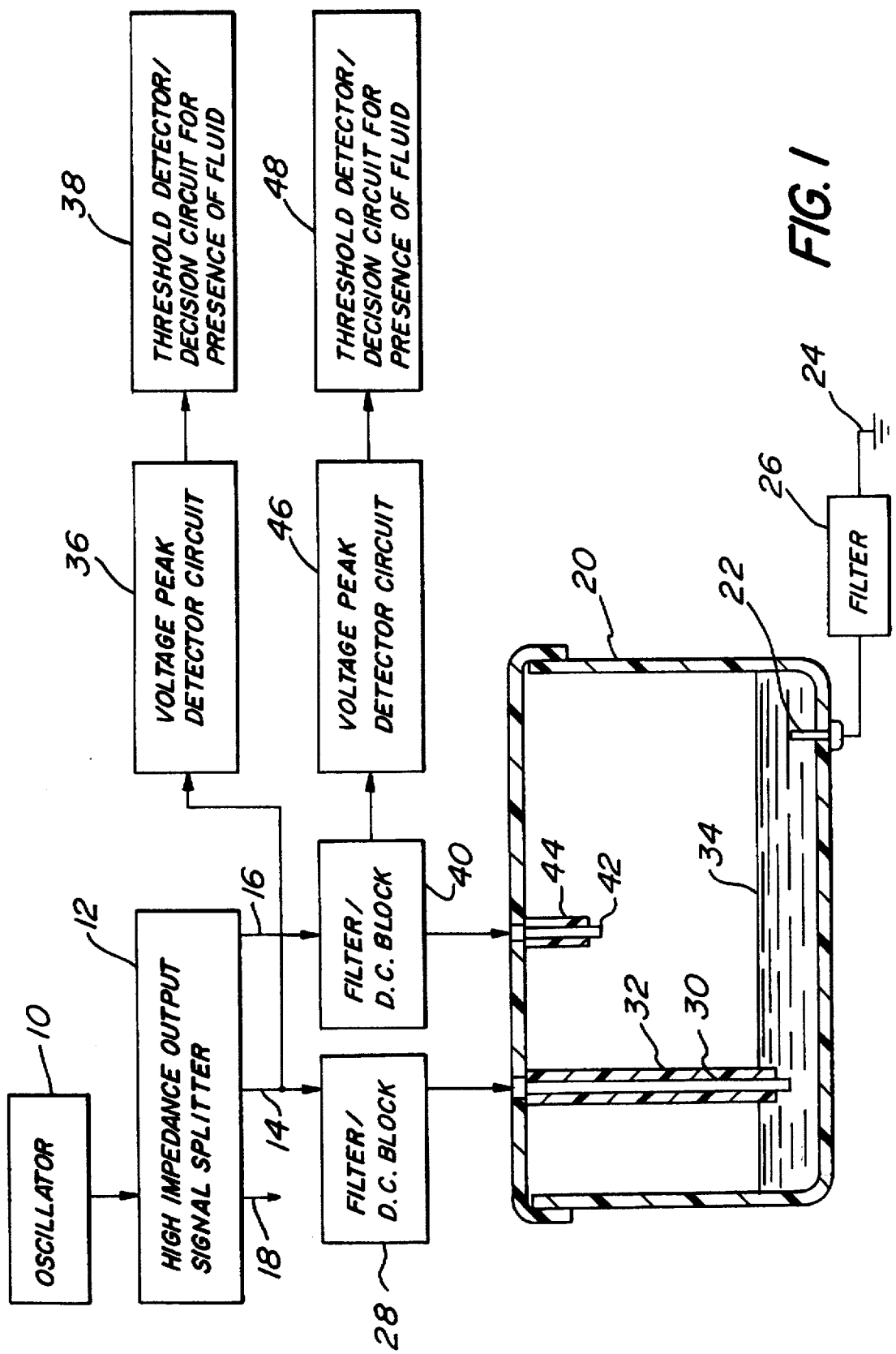
FIG. 1 is a block diagram of a liquid level detecting system in accordance with the present invention.
Figure 2:
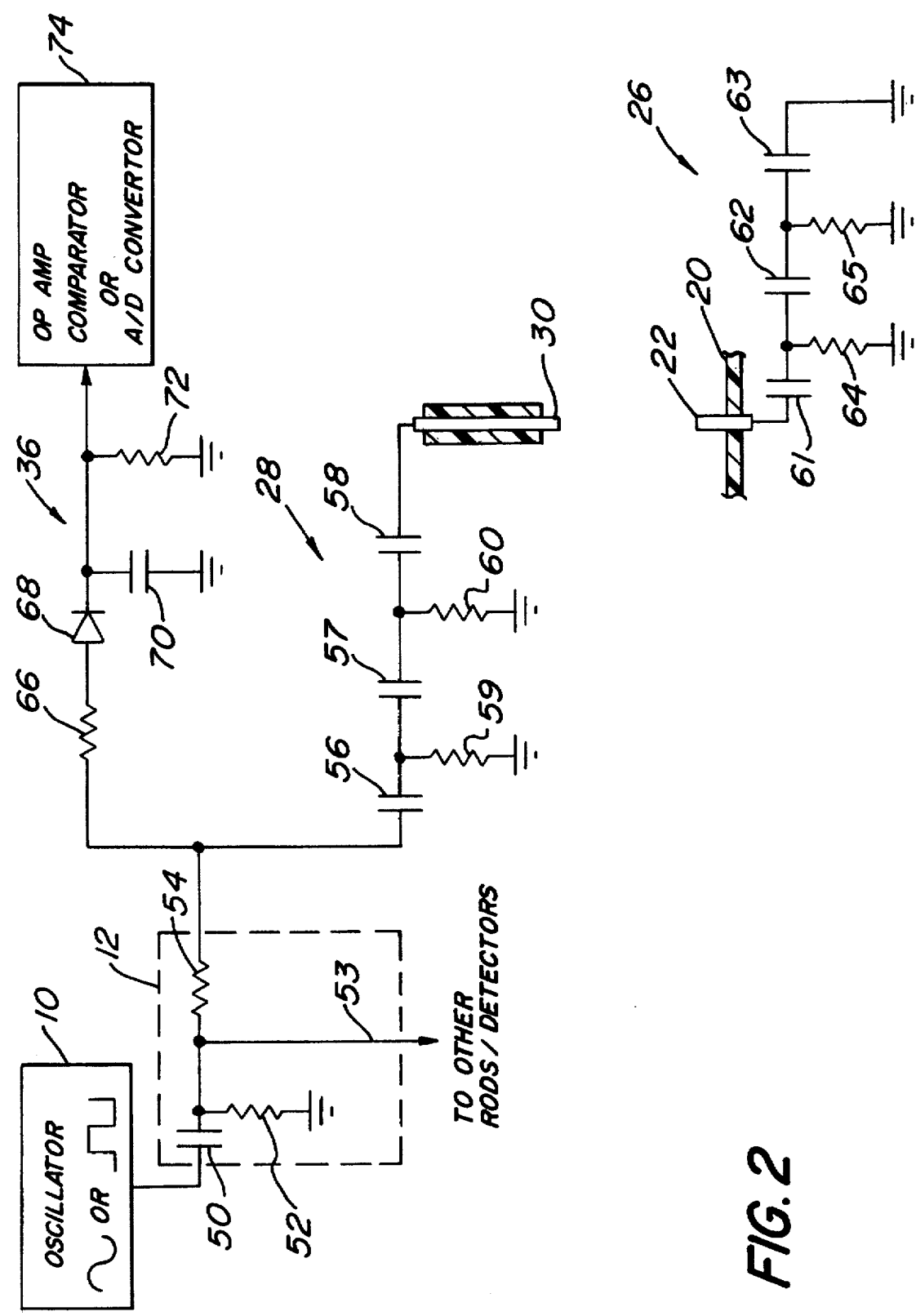
FIG. 2 is a schematic diagram, partially in block diagram form, illustrating some of the circuitry in greater detail.

Referring now to the drawings in detail, wherein like numerals indicate like elements, there is shown in FIG. 1 a liquid level detecting system in accordance with the present invention. FIG. 2 discloses circuitry for one conductive sensing rod in greater detail.

Referring now to FIG. 1, there is shown an oscillator 10. Oscillator 10 may have a sinusoidal or a rectangular wave output, including a square wave output. A rectangular or square wave output oscillator is less sensitive to variations in temperature. However, any suitable form of oscillator having a suitable frequency range may be utilized in practicing the present invention. The frequency range of the output of oscillator 10 is from about 600 hertz to about 100 kHz. The presently preferred frequency range of oscillator 10 is from about 3 kHz to 50 kHz. The frequency range of about 600 hertz to about 100 kHz may be referred to in the art and in this application as audio frequency, although classically audio frequency has been considered to end at about 20 kHz. It is noted that some audio amplifiers and processing circuits today have an effective frequency range up to about 100 kHz for producing high fidelity sound although it is usually considered to be well above what the human ear can detect.

The output of oscillator 10 is fed to circuit 12 which is a high impedance output signal splitter. High impedance output signal splitter 12 includes a capacitor blocking any DC component and provides a high impedance output to the circuitry which it feeds. High impedance output signal splitter 12 may provide a plurality of outputs 14, 16 and 18. Output 18 is indicated as being an output which would be suppliable to additional sensing rods in the tank or container if such were desired.

Container 20 is illustrated as being comprised of a non-conductive material. Although this invention is not limited to a particular application, a presently preferred application of the present invention is for use in holding tanks on pleasure boats which are most often made of a non conductive material such as fiberglass or other synthetic plastic materials. This application for sensing liquid levels is particularly brutal to electrical and electronic level sensing components since it contains water having a non neutral pH, caustic materials and floating solids. The floating solids tend to interfere with any type of mechanical floats as well as sensors such as spaced capacitor plates between which the solid material may become lodged destroying any accuracy of the readings. Further, material in these tanks is prone to cause sludge on various components which may create short circuits and other problems. Furthermore, any DC current flowing through these sensing rods and material in the tank tends to create electrolysis. Such electrolytic effects on the sensing rods substantially shorten the rod life.

Within tank 20, there is shown a conductive AC grounding rod 22 mounted in a lower portion of container 20, and preferably at or near the bottom of container 20. Conductive rod 22 is referred to as an AC grounding rod as it is connected to ground 24 through a first electrical filter 26. First electrical filter 26 contains a DC block and may be referred to as a high pass filter, passing frequencies above 600 hertz. In this manner, DC is eliminated from the circuitry as well as artifacts which may be caused by standard 60 hertz alternating current power, particularly when a boat is connected to shore power. However, preferably, filter 26 may be a band pass filter which will pass only frequencies at or around the frequency of oscillator 10.

The output of high impedance output signal splitter 12 on output 14 is fed to a second filter 28. Second filter 28 also acts as a DC block containing at least one series capacitor. Second filter 28 is also a high pass filter and preferably a band pass filter for passing the output of oscillator 10.

The output of filter 28 is applied to a first conductive sensing rod 30 mounted in container 20 at a position above AC grounding rod 22. Preferably conductive sensing rod 30 is provided with an insulated covering 32 which extends from its upper end to substantially its tip at the lower end. Insulated covering 32 is provided to help insure that a short does not develop from conductive sensing rod 30 along the inside of the cover and inside side walls of container 20 to grounding rod 22, particularly by sludge or the like.

In operation, the output of oscillator 10 is fed through high impedance output signal splitter 12 to filter 28 and to conductive sensing rod 30. If liquid level 34 is below the exposed tip of conductive sensing rod 30, there will be a high impedance between conductive sensing rod 30 and AC grounding rod 22 resulting in a relatively large AC signal being fed to voltage peak detector circuit 36. Once fluid level 34 rises to the point shown in FIG. 1 wherein the conductive fluid, such as water with various impurities therein, covers both the tip of conductive sensing rod 30 and AC grounding rod 22, a conductive path is created to ground causing a significant drop in the level of signal fed to voltage peak detector circuit 36. This drop in peak voltage detected by voltage peak detector circuit 36 is detected by a threshold detector 38. Threshold detector 38 may contain decision circuitry for the presence of fluid, or the output of threshold detector circuit may be fed to other logic circuitry. In any event, the rising of the liquid level to create a highly conductive or low impedance path between the tip of sensing conductor 30 and AC grounding rod 22 causes a significant drop in the output voltage which enables the threshold detector to detect that the fluid level has risen to the lower tip of conductive sensing rod 30.

By placing a plurality of conductive sensing rods at different levels within tank 20, the level of fluid 34 may be detected at each such location. In a presently preferred embodiment, at least two conductive sensing rods would be so mounted, one being located such that its lower tip is covered by fluid when the tank is about 10% full and a second being located at a position where its lower tip is covered when the tank is about 75% full. However, it is understood that any number of such conductive sensing rods may be utilized. For example, ten such conductive sensing rods may be utilized to provide a readout at 10%, 20%, 30% etc.

Accordingly, it may be seen that, in a similar manner, output 16 of high impedance output signal splitter 12 may be fed to a third filter 40, which may be similar to that of filter 28. The output of filter 40 may be fed to a second conductive sensing rod 42 which may have an insulated covering 44. Conductive sensing rod 42 with its cover 44 may be similar to conductive sensing rod 30 with its insulative covering 32 with a proviso that the exposed tip of conductive sensing rod 42 is mounted at a position in container 20 above that of conductive sensing rod 30.

Although conductive sensing rods 30 and 42 are shown to be depending from the top of tank 20, it is understood that the connective sensing rod may be positioned through the sidewall of the tank at various heights in the tank to achieve the same result. Accordingly, the term conductive sensing rod is meant to cover both of these arrangements as well as other variations of positioning the conductive sensing rods at various heights within the container or tank.

In a similar manner with respect to liquid sensing rod 42, voltage peak detector 46 detects the voltage developed between filter 40 and AC ground 24 and feeds this output to threshold detector 48. As described with respect to conductive sensing element 30, when the fluid level 34 rises to the exposed tip of conductive sensing rod 42, a conductive path is created between conductive sensing rod 42 and AC grounding rod 22 substantially reducing the voltage fed to voltage peak detector circuit 46. This decrease is detected by a threshold detector 48 indicating that the level has risen to the position of the exposed tip of conductive sensing rod 42.

Referring now to FIG. 2, a presently preferred embodiment of the circuitry is shown in somewhat greater detail. Oscillator 10 in FIG. 2 has been described previously. Oscillator 10 may be any suitable oscillator. One conventional type of oscillator is that available on half of a Motorola chip 4011. Another is a LM 2904 chip made and commercially available from National Semiconductor of Santa Clara, Calif. A third type of conventional oscillator which may be used is a generic 555 timer which is a square wave generator. However, any suitable oscillator which produces a frequency in a range of 600 hertz to 100 kilohertz may be utilized and such oscillator may produce a sign wave, square wave or other rectangular wave as its output.

The output of oscillator 10 is fed to high impedance output signal splitter 12 which may be comprised of capacitor 50, resistor 52 connected to ground and resistor 54. The high impedance output may be tapped from the connection between resistor 52 and capacitor 50 and fed through an isolation resistor 54. As illustrated by line 53, the high impedance oscillator output may be fed to other rods and detectors through suitable isolation resistors.

The output of high impedance output signal splitter 12 may be fed through second filter 28 comprised of capacitors 56, 57 and 58 and resistors 59 and 60 to first conductive sensing rod 30. When there is no liquid in the tank as shown in FIG. 2, there is a very high impedance between conductive sensing element 30 and conductive AC grounding rod 22. Conductive AC grounding rod 22 is connected to ground through capacitors 61, 62 and 63, which together with resistors 64 and 65 form a high pass filter.

By way of example, and not by way of limitation, in one presently preferred embodiment, capacitors 50, 56, 58, 61 and 63 may be 0.047 microfarads. Capacitors 57 and 62 may be 3300 picofarads, resistors 52 and 54 may be 100 kohms and resistors 59, 60, 64 and 65 may be 1 megohm.

Voltage peak detector 36 may be comprised of resistor 66, diode 68, capacitor 70 and resistor 72. By way of example and not limitation, in one presently preferred embodiment, diode 68 may be a 1N4148 diode, resistor 66 may be 430 kohms, capacitor 70 may be 0.047 microfarads and resistor 72 may be 4.7 megohms.

The output of voltage peak detector circuit 36 may be fed to an operational amplifier comparitor circuit or analog to digital convertor circuit 74.

It will be apparent to those skilled in the art that various changes and modifications may be made. Circuit values may be changed, the arrangement of the conductive sensing rods may be modified, other voltage peak detectors and threshold detectors may be used.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. A liquid level detecting system for detecting a conductive liquid level in a container, comprising:

a conductive AC grounding rod mounted in a lower portion of said container;

a conductive sensing rod mounted in said container at a position above said conductive grounding rod;

an oscillator for producing an output having a frequency in the range of about 600 hertz to about 100 kilohertz;

a circuit for supplying the output of said oscillator at a high impedance output to said conductive sensing rod;

a circuit being completed through said, conductive sensing rod and said conductive AC grounding rod when a conductive liquid in the container immerses both said conductive sensing rod and said conductive grounding rod, said circuit including an electrical filter circuit which blocks DC and passes AC above 600 hertz; and circuit means for sensing a change in the voltage developed across said circuit when the conductive liquid in said container first reaches a level to immerse both said conductive grounding rod and said conductive sensing rod.

2. A liquid level detecting system in accordance with claim 1 wherein said filter is a band pass filter having a band pass adapted to pass the frequency of said oscillator and rejecting frequencies below and above said oscillator frequency.

3. A liquid level detecting system in accordance with claim 1 wherein said conductive sensing rod is provided with an insulative covering for substantially its entire length, exposing a tip of said conductive sensing rod.

4. A liquid level detecting system in accordance with claim 1 wherein said circuit for detecting includes a voltage peak detector circuit and a threshold detector circuit.

5. A liquid level detecting system for detecting a conductive liquid level in a non-conductive container, comprising:

a conductive AC grounding rod mounted in a lower portion of said container;

a first electrical filter connected to said conductive grounding rod and to a ground potential, said electrical filter blocking DC current and passing AC current;

a conductive sensing rod mounted in said container at a position above said AC grounding rod;

an oscillator producing an output having a frequency in the range of about 600 hertz to about 100 kilohertz;

a circuit for receiving the output of said oscillator and providing said oscillator output signal at a high impedance output;

a second electrical filter connected to said high impedance output and to said conductive sensing rod, said second electrical filter blocking DC current and passing AC current;

a voltage peak detector circuit connected to said high impedance output for detecting peak voltage at said high impedance output and producing an output;

a threshold detector circuit for receiving the output of said voltage peak detector circuit;

and wherein said threshold detector produces a change in output signal when the conductive liquid level in said container changes from immersing only said conductive grounding rod to immersing both said conductive grounding rod and said conductive sensing rod.

6. A liquid level detecting system in accordance with claim 5 wherein said output of said oscillator is a sine wave.

7. A liquid level detecting system in accordance with claim 5 wherein said output of said oscillator is a rectangular shaped wave.

8. A liquid level detecting system in accordance with claim 5 wherein said electrical filter connected to said conductive grounding rod is a band pass filter designed to pass the frequency of said output of said oscillator.

9. A liquid level detecting system in accordance with claim 5 wherein said second electrical filter is a band pass filter designed to pass the frequency of the output of said oscillator.

10. A liquid level detecting system in accordance with claim 5 wherein said conductive sensing rod is provided with an insulated covering except for a lower most portion of said rod.

11. A liquid level detecting system in accordance with claim 5 wherein said circuit for receiving the output of said oscillator provides said oscillator output signal at a high impedance to a third electrical filter connected to a second conductive sensing rod mounted in said container at a position above said first conductive sensing rod.

12. A liquid level detecting system in accordance with claim 11 including a voltage peak detector circuit, isolated by a resistance from said high impedance output, to detect peak voltage developed between said third filter and an AC ground.

13. A liquid level detecting system in accordance with claim 5 including a plurality of conductive sensing rods mounted in said container at differing positions above said AC grounding rod, said oscillator providing an output to each of said conductive sensing rods through an electrical filter and a voltage peak detector circuit for each of said plurality of conductive sensing rods in a threshold detector circuit for each of said plurality of voltage peak detector circuits whereby a liquid level in said container may be detected at a plurality of positions above said AC grounding rod.

14. A liquid level detecting system in accordance with claim 5 wherein said threshold detector circuit is an operational amplifier comparator circuit.

15. A liquid level detecting system in accordance with claim 5 wherein said threshold detector circuit is an analog to digital convertor circuit.

* * * * *